US012046813B2

(12) United States Patent
Zhang et al.

(10) Patent No.: US 12,046,813 B2
(45) Date of Patent: Jul. 23, 2024

(54) ANTENNA FILTER UNIT, AND RADIO UNIT

(71) Applicant: Telefonaktiebolaget LM Ericsson (publ), Stockholm (SE)

(72) Inventors: Xueyuan Zhang, Beijing (CN); Juandi Song, Beijing (CN); Ningmin Liu, Beijing (CN); Jianlan Li, Beijing (CN); Junming Li, Beijing (CN); Lei Sun, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 177 days.

(21) Appl. No.: 17/633,854

(22) PCT Filed: Aug. 7, 2020

(86) PCT No.: PCT/CN2020/107850

§ 371 (c)(1),
(2) Date: Feb. 8, 2022

(87) PCT Pub. No.: WO2021/027730

PCT Pub. Date: Feb. 18, 2021

(65) Prior Publication Data

US 2022/0294108 A1 Sep. 15, 2022

(30) Foreign Application Priority Data

Aug. 9, 2019 (CN) ........................ 201921286701.0

(51) Int. Cl.

*H01Q 1/52* (2006.01)
*H01Q 1/24* (2006.01)
*H01Q 19/10* (2006.01)

(52) U.S. Cl.

CPC ............. *H01Q 1/523* (2013.01); *H01Q 1/246* (2013.01); *H01Q 19/10* (2013.01)

(58) Field of Classification Search

CPC ........ H01Q 1/523; H01Q 1/246; H01Q 19/10; H01Q 1/44; H01Q 1/521; H01Q 21/065; H01P 1/2053

See application file for complete search history.

(56) References Cited

U.S. PATENT DOCUMENTS 6,329,949 B1 12/2001 Barnett et al.
11,322,836 B2 5/2022 Kim et al.
(Continued)

FOREIGN PATENT DOCUMENTS

CN 204793134 U 11/2015
CN 107221747 A 9/2017
(Continued)

OTHER PUBLICATIONS

International Search Report and Written Opinion issued in International Application No. PCT/CN2020/107850, dated Oct. 28, 2020 (8 pages).

*Primary Examiner* — Seung H Lee

(74) *Attorney, Agent, or Firm* — Rothwell, Figg, Ernst & Manbeck, P.C.

(57) ABSTRACT

Embodiments of the disclosure provide an antenna filter unit and a radio unit. The antenna filter unit includes a radiation unit and a cavity filter coupled to the radiation unit. The radiation unit is arranged on an outer side of a wall of a cavity of the cavity filter. At least a part of the wall is also arranged as a reflection plate for the radiation unit. The radio unit includes the above-mentioned antenna filter unit and a radio circuit board. According to the antenna filter unit and the radio unit provided by embodiments of the disclosure, the number and volume of elements in a radio system are reduced, the degree of integration can be improved, the weight and installation space are reduced, and the costs are reduced.

12 Claims, 8 Drawing Sheets

(56) References Cited

U.S. PATENT DOCUMENTS

| | | | | |
|---|---|---|---|---|
| 11,387,564 | B2 * | 7/2022 | Kim | H01P 1/207 |
| 2005/0225411 | A1 * | 10/2005 | Sauder | H01P 1/208 333/202 |
| 2009/0153271 | A1 * | 6/2009 | Park | H01P 1/2053 333/203 |
| 2012/0098613 | A1 * | 4/2012 | Han | H03J 1/0008 333/17.1 |
| 2012/0293279 | A1 | 11/2012 | Gong et al. | |
| 2017/0098877 | A1 | 4/2017 | Subedi et al. | |
| 2020/0287260 | A1 * | 9/2020 | Kim | H01P 1/20318 |

FOREIGN PATENT DOCUMENTS

| | | | |
|---|---|---|---|
| CN | 107706544 | A | 2/2018 |
| CN | 108767447 | A | 11/2018 |
| CN | 209948056 | U | 1/2020 |
| EP | 2 270 926 | A1 | 1/2011 |
| EP | 2 894 710 | A1 | 7/2015 |
| WO | 2019/139281 | A1 | 7/2019 |

* cited by examiner

ANTENNA FILTER UNIT, AND RADIO UNIT

CROSS REFERENCE TO RELATED APPLICATION

This application is a 35 U.S.C. § 371 National Stage of International Patent Application No. PCT/CN2020/107850, filed Aug. 7, 2020, which also claims priority to Chinese Patent Application No. 201921286701.0, filed on Aug. 9, 2019. The above identified applications are incorporated by this reference.

TECHNICAL FIELD

The disclosure relates to radio communication technology, and in particular, to an antenna filter unit and a radio unit.

BACKGROUND

In modern communication systems, the size and weight of not only terminal devices, but also node devices in communication networks are expected to be reduced.

For example, a base station (BS), as an important part of a mobile communication system, usually comprises a baseband unit (BU), a radio unit (RU), and an antenna unit (AU). In a common base station solution, a radio unit (for example, a remote radio unit (RRU)) and an antenna unit are two separate independent units, and both are suspended on high-rise buildings (for example, roofs, communication towers, etc.). Taking into account factors such as installation, fixation, and space occupation, small size and light weight have always been an important development direction of design of various base stations (for example, legacy base stations, street macro base stations, micro base stations, small cell and advanced antenna system (AAS) base stations).

In order to achieve the above goals of small size and light weight, the size of various units in radio systems is reduced as much as possible. However, from a perspective of performance, the magnitude of volume is always related to passive intermodulation (PIM), power, and heat. It is becoming more and more important to study how to obtain better performance under a limited size and how to ensure sufficient performance under the smallest size.

Merely reducing the size of various units will be difficult to meet the needs of the overall miniaturization of radio systems.

SUMMARY

The disclosure provides an antenna filter unit and a radio unit.

According to a first aspect of the disclosure, there is provided an antenna filter unit, including: a radiation unit, and a cavity filter coupled to the radiation unit. The radiation unit is arranged on an outer side of a wall of a cavity of the cavity filter. At least part of the wall is also arranged as a reflection plate of the radiation unit.

In an embodiment of the disclosure, the antenna filter unit further includes: an isolation bar arranged on the at least part of the wall and located among a plurality of radiation elements of the radiation unit.

In an embodiment of the disclosure, the isolation bar includes a protrusion structure formed by die casting.

In an embodiment of the disclosure, the radiation unit is coupled to the cavity filter via a pin connector.

In an embodiment of the disclosure, the pin connector is coupled to a resonant column in the cavity of the cavity filter.

In an embodiment of the disclosure, the pin connector is configured to be inductively coupled to the resonant column.

In an embodiment of the disclosure, the pin connector is configured to be capacitively coupled to the resonant column.

In an embodiment of the disclosure, the pin connector includes a metal pin arranged perpendicular to the at least part of the wall.

In an embodiment of the disclosure, the antenna filter unit further includes a feed network. The radiation unit is coupled to the pin connector via the feed network.

According to a second aspect of the disclosure, there is provided a radio unit, including: the antenna filter unit according to any one of the above, and a radio circuit board.

According to the antenna filter unit and the radio unit provided by embodiments of the disclosure, the number and volume of elements in a radio system are reduced, the degree of integration can be improved, the weight and installation space are reduced, and the costs are reduced.

BRIEF DESCRIPTION OF THE DRAWINGS

In order to explain the technical solutions of the embodiments of the disclosure more clearly, the drawings of the embodiments will be briefly described below. It should be understood that the drawings described below only refer to some embodiments of the disclosure, not to limit the disclosure, wherein.

DETAILED DESCRIPTION

In order to make the technical solutions and advantages of the embodiments of the disclosure clearer, the technical solutions of the embodiments of the disclosure will be described below clearly and completely in conjunction with the accompanying drawings. Obviously, the described embodiments are part of the embodiments of the disclosure, but not all of the embodiments. Based on the described embodiments of the disclosure, all other embodiments obtained by those skilled in the art without creative labor are also within the protection scope of the disclosure.

Figure 1:
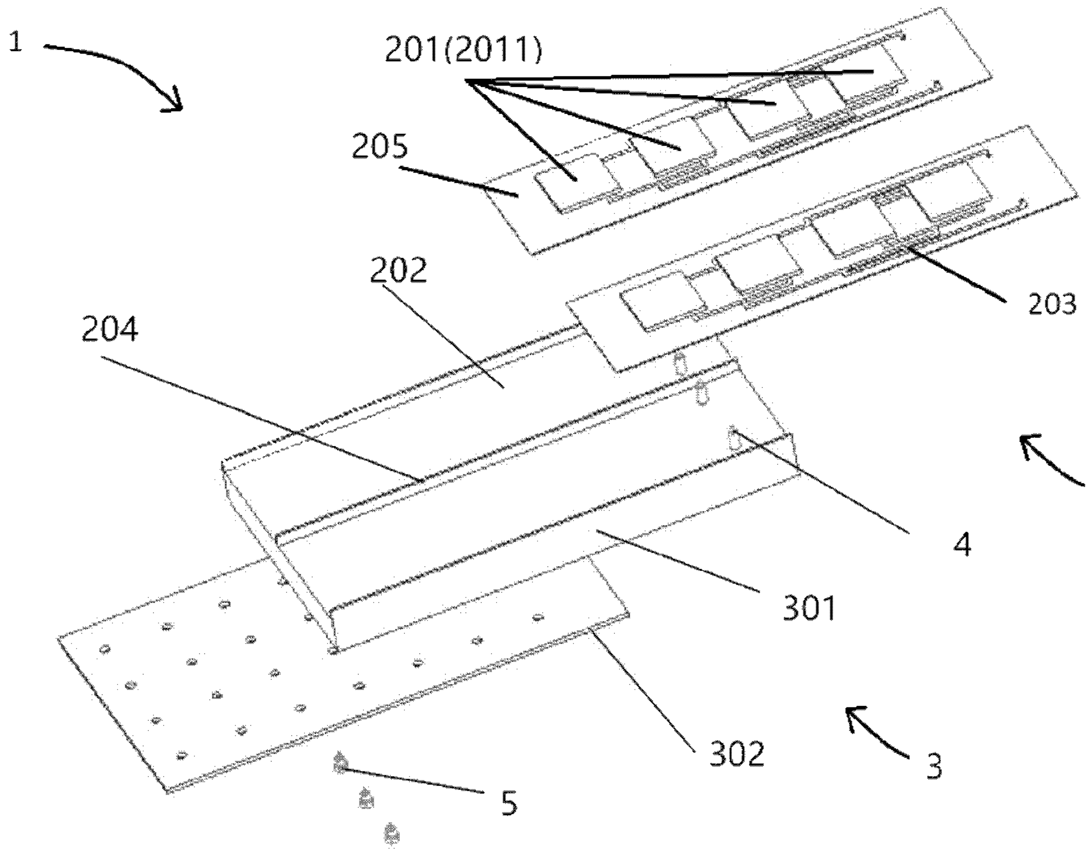
FIG. 1 is an exploded schematic diagram of an antenna filter unit provided by an embodiment of the disclosure.
Figure 2:
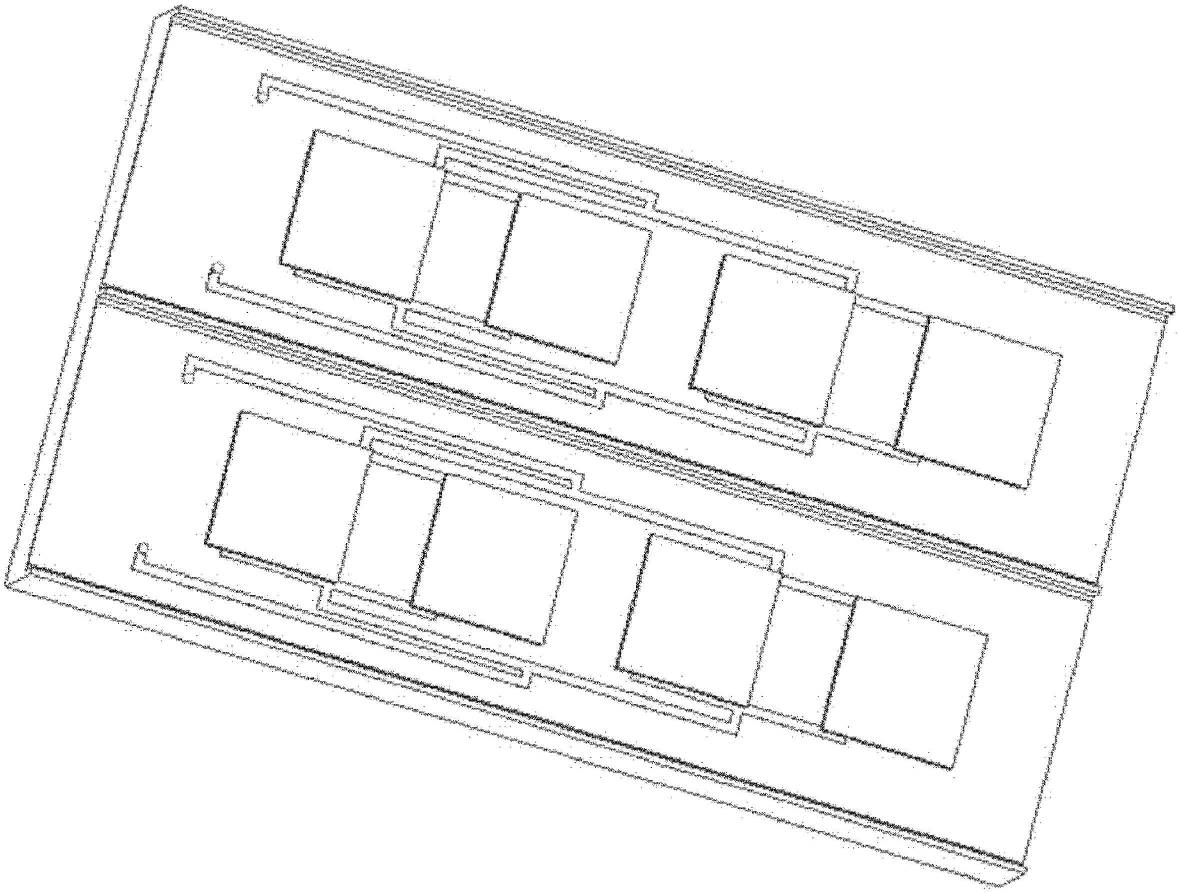
FIG. 2 is an upper view of the antenna filter unit in FIG. 1.
Figure 3:
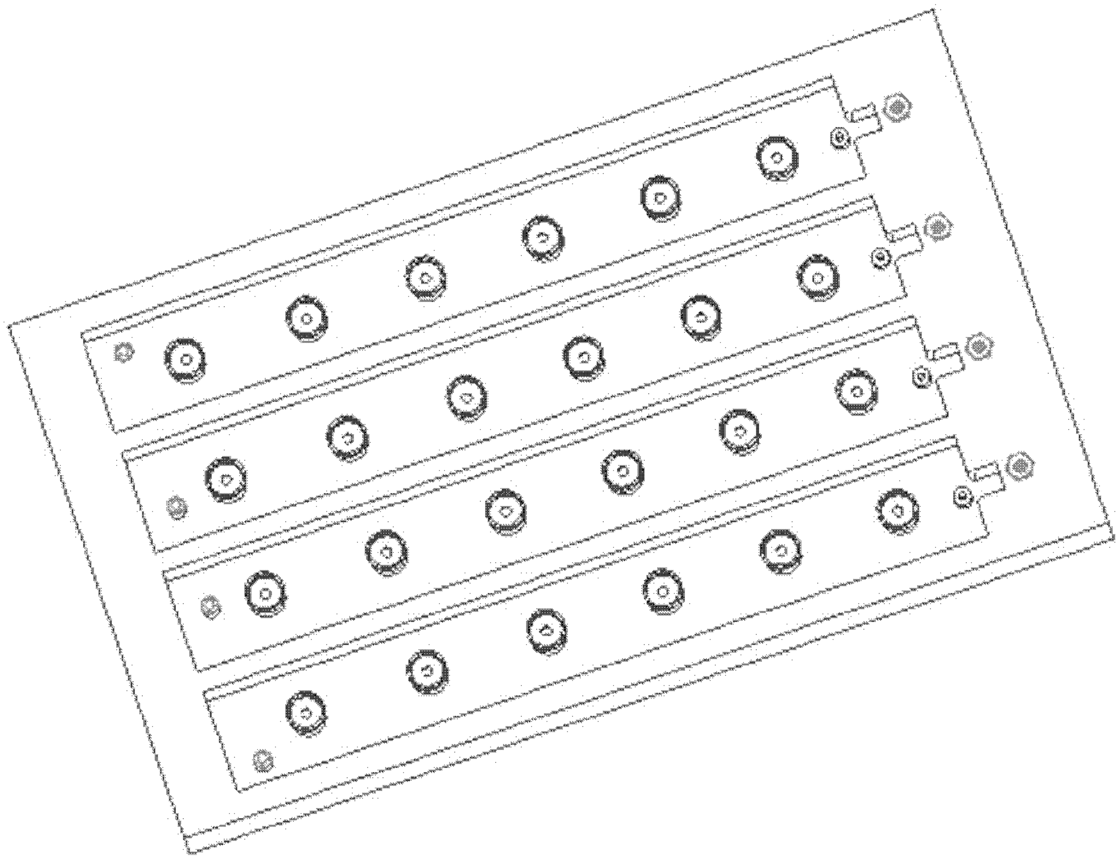
FIG. 3 is a bottom view of the antenna filter unit in FIG. 1.

FIG. 1 is an exploded schematic diagram of an antenna filter unit provided by an embodiment of the disclosure. FIG. 2 is an upper view of the antenna filter unit in FIG. 1. FIG. 3 is a bottom view of the antenna filter unit in FIG. 1.

As shown in FIGS. 1 to 3, an antenna filter unit (AFU) 1 may include: a radiation unit 201 and a cavity filter 3 coupled to the radiation unit. The radiation unit 201 is arranged on the outer side of the wall of the cavity 301 of the cavity filter 3. At least a part of the wall is also arranged as a reflection plate 202 for the radiation unit 201. For example, at least a part of the wall provides a metal plane, and the radiation unit 201 is supported on at least a part of the wall. At least a part of the wall (ie, the reflection plate 202) can be directly used to reflect radiation signals generated by the radiation unit 201, without the need to provide another separate metal plate.

The radiation unit 201 and the reflection plate 202 may be marked as an antenna unit 2. Such an antenna unit 2 can operate like any conventional antenna unit.

The antenna filter unit 1 (or the antenna unit 2) may further include a feed network 203. A plurality of radiation elements 2011 in the radiation unit 201 is electrically coupled to the feed network 203 to realize the transmission of electrical signals, so that signals to be sent out are transmitted from the feed network 203 to the radiation elements 2011, and received signals are transmitted from the radiation elements 2011 to the feed network 203.

It should be understood that the term "coupled" is intended to describe a direct or indirect electrical connection, which allows the transmission of electrical signals.

In addition, the cavity filter 3 may include: a cavity 301 and a resonant column (not shown in FIG. 1) located in the cavity. The structure of the cavity 301 (including the internal resonant column) can filter undesired signals. The cavity 301 may be electrically coupled to the feed network 203 of the antenna unit 2 via a connector, and may also be electrically coupled to a circuit board (a radio circuit board) with functions such as a power amplifier and a transceiver via another connector. It should be understood that such a radio circuit board may be provided separately from the above-mentioned antenna filter unit 1, electrically coupled to the cavity filter 3 via a cable or the like, or may be combined with the cavity filter 3 in the same radio unit. Such a radio unit will completely replace the usual remote radio unit (RRU) and so on. Like the legacy remote radio unit (RRU), the circuit board in such a radio unit can be coupled to a baseband unit in a base station via optical fibers, cables, etc.

As an example for comparison, when increasing the degree of system integration of radio systems, it is considered to reduce the size of individual elements in the systems and/or increase the degree of integration of radio assemblies. For example, a radio unit (for example, a remote radio unit (RRU)) and an antenna unit (AU) may be centrally configured and installed in a radio assembly to effectively use the space and make the structure compact. However, considering factors such as electrical performance, a bottleneck that the sizes of a radio unit, an antenna unit, etc. formed separately cannot be further reduced may be encountered, and merely improving installation manners cannot further reduce the occupied space.

As shown in FIG. 1, in the embodiment of the disclosure, the reflection plate 202 for the antenna unit 2 may be a part of the cavity 301 of the cavity filter 3. For example, the reflection plate 202 may be the whole of the wall on either side of the cavity 301 or a part of the wall.

In this way, by means of the reusage of part of the structure of the antenna unit 2 with the cavity filter 3, the number and volume of elements in the radio system can be further reduced, the degree of integration can be improved, the weight and installation space can be reduced, and the cost can be reduced.

It should be understood that in the antenna filter unit 1 described in FIG. 1, the specific manufacturing and installation manners are not limited.

For example, the cavity filter 3 may be provided as a complete product as a whole, which already includes at least a part of the wall on one side as the reflection plate 202 for the antenna assembly 2 during the manufacturing process. For example, at least a part of the wall is planar and metal to reflect radiation signals generated by the radiation unit 201 in the antenna assembly 2. During the installation process, it is only necessary to further combine the radiation unit 201 and the feed network 203 of the antenna assembly 2 so that the antenna unit 2 and the cavity filter 3 can work according to the design requirements. In addition, the radiation unit 201 and the feed network 203 of the above-mentioned antenna assembly 2 may also be pre-combined/manufactured components (for example, both are arranged on an antenna board 205 shown in FIG. 1) to further facilitate integration and installation. Therefore, by arranging the radiation element 2011 and the feed network 203 on the antenna board 205, they can be easily assembled on the wall (the reflection plate 202) of the cavity 301. As an example, the antenna board 205 may be a printed circuit board (PCB) or the like to facilitate the production of the radiation element 2011 in the form of a patch, and the feed network 203 including a plurality of printed circuit lines.

In addition, the antenna unit 2 including the radiation unit 201, the reflection plate 202, and the feed network 203 may also be provided as a complete product. Then during the installation process, the reflection plate 202 is combined with the rest of the cavity filter 3, so that the antenna unit 2 and the cavity filter 3 can work according to the design requirements. For example, the reflection plate 202 can be used as a detachable bottom plate of the cavity 301 of the cavity filter 3, combined and installed with a frame composed of the remaining walls of the cavity 301 to form a closed cavity 301.

In an embodiment of the disclosure, the radiation unit 201 may include any type of radiation element 2011 (also called a oscillator), for example, it may be in the form of a patch or various planner or a three-dimensional shapes, obtained by metal plate, die casting, etc. and the material can be metal or at least includes a part of plastics.

Further, the materials for the cavity filter 3 may be metal, but also not limited to metal. Other possible materials, such as plastic, may also be used for the cavity filter 3.

Referring to FIGS. 1 to 3, in the embodiments of the disclosure, the antenna filter unit 1 may further include an isolation bar 204. The isolation bar 204 may be provided on at least a part of the wall (the reflection plate 202) and located among a plurality of radiation elements 2011 of the radiation unit 201. The isolation bar 204 is provided when it is necessary to reduce the mutual coupling effect between different radiation elements 2011, and is particularly suitable for array antennas (for example, multiple input multiple output (MIMO) antennas). As a non-limiting example, FIGS. 1 to 3 show a case wherein an isolation bar 204 is used to isolate two columns of radiation elements 2011.

It should be understood that the number, size and arrangement of the radiation elements 2011 can be adjusted according to the application environment and requirements, and there is no limitation. For example, FIGS. 1 to 3 show a 4*2 arrangement, which can be advantageously applied to a small cell and other situations.

In an embodiment of the disclosure, the isolation bar 204 may include a protrusion structure, formed during the die casting process, provided on the reflection plate 202. For example, the isolation bar 204 and the cavity 301 can be simultaneously formed by die casting. That is to say, in the embodiment of the disclosure, the cavity, the reflection plate, and the isolation bar that are manufactured separately in the legacy case will be implemented in the same die casting process.

For example, referring to FIG. 1, in the embodiment of the disclosure, the cavity 301 may be a bottom plate that is simultaneously formed with the sidewalls and the resonant column in the cavity by die casting, which is also beneficial to the shaping of the reflection plate 202 and the isolation bar 204. Since there is an opening after die casting, a cover plate 302 is used to cover the opening, and a connector 5 is provided via the cover plate to electrically couple the cavity filter 3 to other circuit boards. The cover plate 302 does not need to be a plane, and various other components such as fastening screws and tuning screws can also be provided.

In the conventional solution as a comparative example, the cavity 301, the reflection plate 202, and the isolation bar 204 are three separate parts, which need to be assembled together with a large number of metal screws and plastic screws, etc. According to the embodiment of the disclosure, at least a part of the cavity 301 is reused with the reflection plate 202, and the isolation bar 204 can be directly arranged on the reflection plate 202. That manner not only reduces the number and volume of components, but also reduces a large number of metal screws and plastic screws, etc., for connection and fixation.

In the embodiment of the disclosure, the radiation unit 201 may be coupled to the cavity filter 3 via a pin connector 4. Specifically, the radiation unit 201 may be coupled to the resonant column in the cavity 301 of the cavity filter 3 via the feed network 203 and the pin connector 4.

In the conventional way as a comparative example, a two-piece or three-piece radio/RF connector (such as a coaxial connector and a cable) is used to connect the antenna unit 2 and the cavity filter 3, and the arrangement of joints of the connector and cables usually take up a lot of assembly space.

In the embodiment of the disclosure, referring to FIG. 1, when the reflection plate 202 is reused with a part of the structure of the cavity 301, the antenna unit 2 as a whole abuts the cavity filter 3 to form a back-to-back stacked structure. Using the pin connector 4 can form a direct plug-in connection manner, reducing the use of extra cables. In particular, a pin connector 4 substantially perpendicular to the reflection plate 202 can be provided, and inserted and positioned in the up and down direction in FIG. 1, so as to further simplify the system structure and installation process. Therefore, legacy two-piece or three-piece radio/RF connectors (such as coaxial connectors and cables) can be eliminated, so as to greatly improve the degree of integration.

In addition, the specific implementation of the pin connector 4 is not limited. For example, a metal pin can be simply used and the two ends thereof are fixed at predetermined positions of the antenna unit 2 and the cavity filter 3 by means of welding, inserting, etc., respectively. Or, any pin (PIN) connector, spring-loaded pin (PO-GO-PIN) connector, etc., that are available on the market or can be customized, can be used.

It should be understood that such a pin connector 4 can also be applied to the connection between the cavity 301 and other radio circuit boards mentioned above, that is, the structure of the connector 5 can be the same as the pin connector 4.

Figure 4:
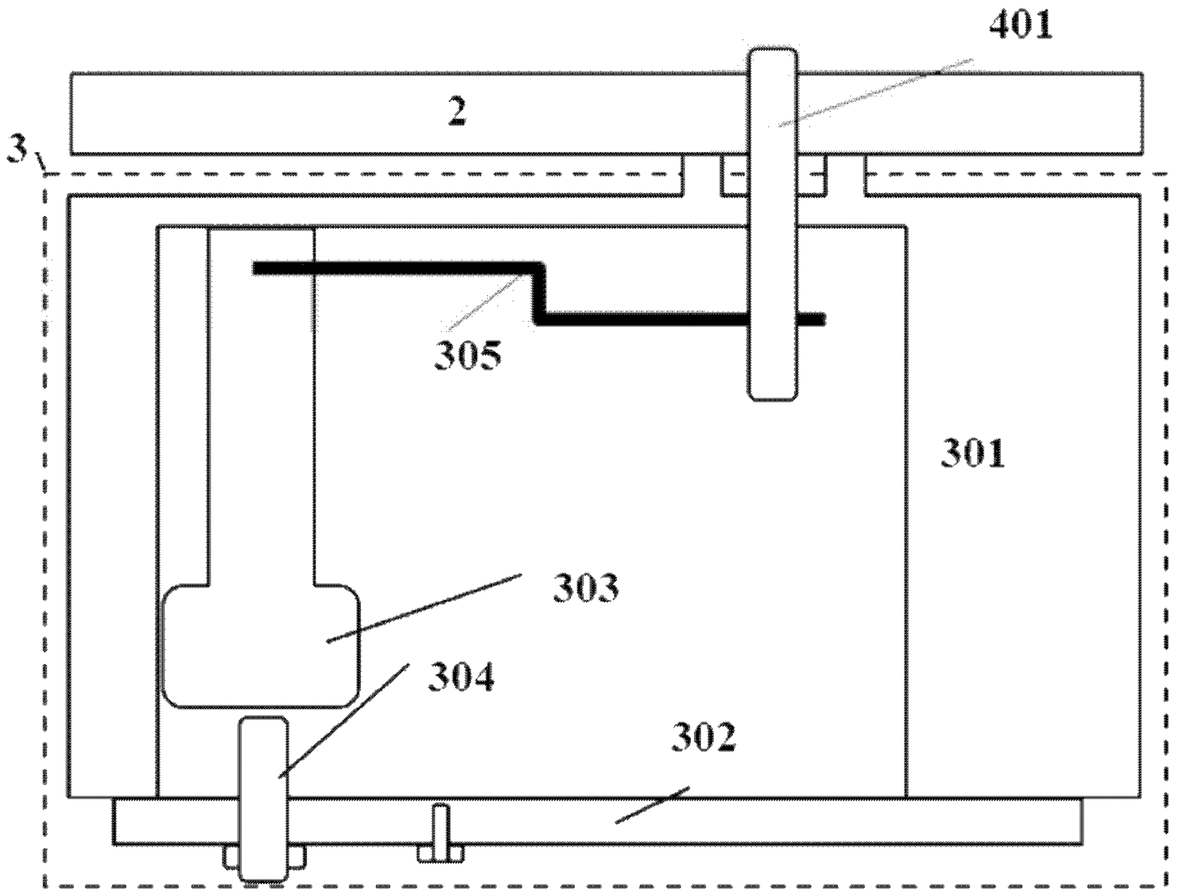
FIG. 4 is a schematic diagram of using a pin connector 4 for connection in an embodiment of the disclosure.

FIG. 4 is a schematic diagram of using a pin connector 4 for connection in an embodiment of the disclosure.

As shown in FIG. 4, according to the embodiment of the disclosure, the metal pin 401 in the pin connector 4 is combined with the cavity filter 3 and fixed to the antenna unit 2. The metal pin 401 can be directly connected to the resonant column 303 in the cavity 301 via a conductor 305 (for example, a metal wire, a metal sheet, etc.), which facilitates the realization of the required inductive coupling therebetween and/or the required port matching resistance, etc. In addition, a tuning screw 304 is also shown in FIG. 4.

The metal pin 401 may be perpendicular to at least a part of the wall (the reflection plate 202). It should be understood that during specific implementation, the metal pin 401 may have various bending parts according to processing or fixing needs, and only needs to be perpendicular to the above-mentioned reflection plate 202 in the overall structure.

The specific manner and sequence of fixing the metal pin 401 to the cavity filter 3 and the antenna unit 2 are not limited. For example, the metal pin 401 may be fixed to the cavity filter 3 first, and fixedly connected to the conductor 305. Then, the antenna board 205 and the like are assembled on the cavity filter 3, and the metal pin 401 can be inserted at this time and soldered to a conductive pad to which the feed network 203 is connected.

In addition, the pin connector 4 may further include a non-metallic support (not shown) and the like for fixing/insulating the metal pin 401.

Figure 5:
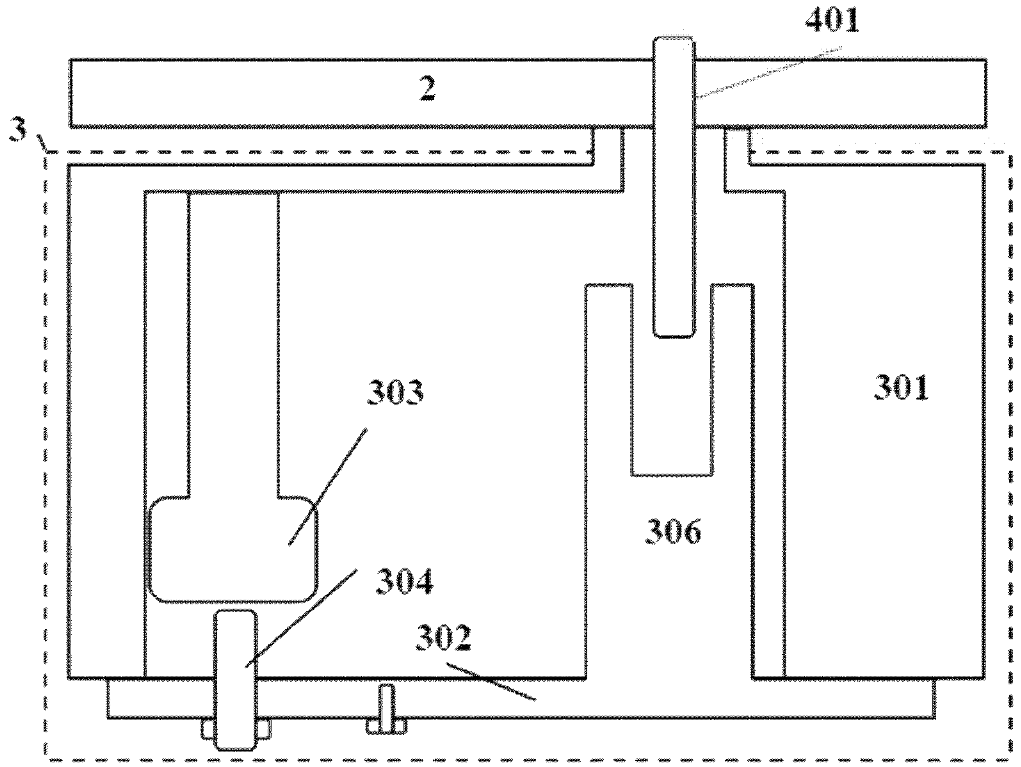
FIG. 5 is another schematic diagram of using a pin connector 4 for connection in an embodiment of the disclosure.

FIG. 5 is another schematic diagram of using a pin connector 4 for connection in an embodiment of the disclosure.

As shown in FIG. 5, according to the embodiment of the disclosure, the metal pin 401 in the pin connector 4 is fixed to the antenna unit 2 and inserted into the cavity filter 3. The metal pin 401 is not directly electrically connected to the resonant column 303, etc., in the cavity 301. That manner facilitates the realization of the required capacitive coupling therebetween.

The specific manner and sequence of fixing the metal pin 401 to the cavity filter 3 and the antenna unit 2 are not limited. For example, the metal pin 401 may be soldered to the conductive pad, to which the feed network 203 is connected. Then, in the process of assembling the antenna unit 2 to the cavity filter 3, it is inserted into a corresponding socket 306 of the cavity filter 3. A non-metallic support (not shown) may also be provided between the metal pin 401 and the socket 306.

It should be understood that FIG. 4 and FIG. 5 only schematically show the main parts for realizing the connection, and should not be understood as a limitation on the number, layout, etc. of each component.

Figure 6:
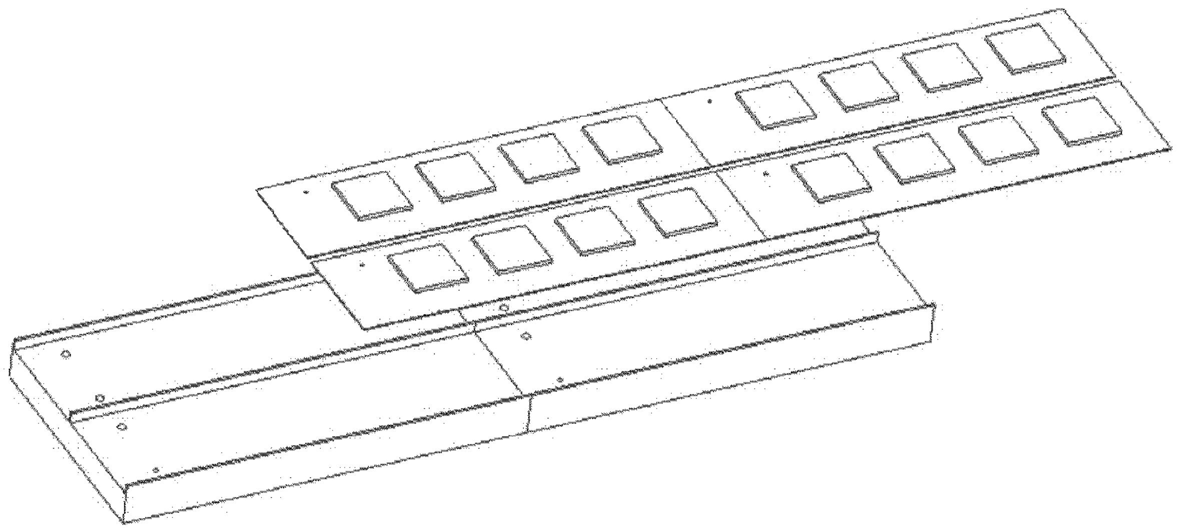
FIG. 6 is an exploded schematic diagram of an antenna filter unit provided by an embodiment of the disclosure.
Figure 7:
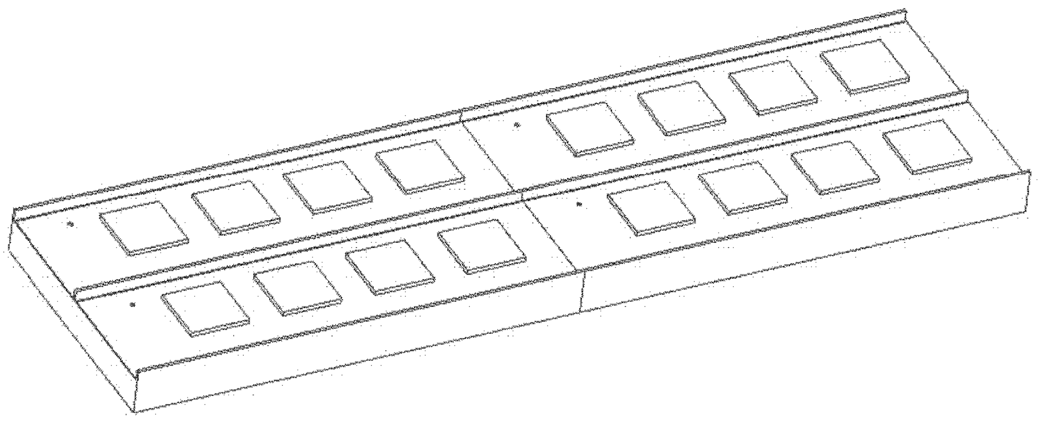
FIG. 7 is an upper view of the antenna filter unit in FIG. 6.
Figure 8:
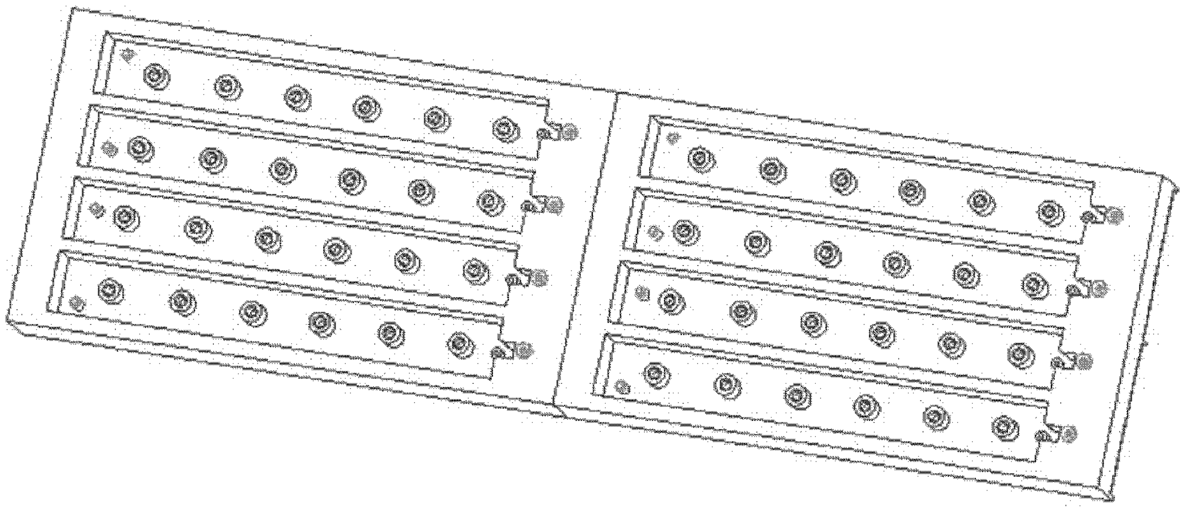
FIG. 8 is a bottom view of the antenna filter unit in FIG. 6.

FIG. 6 is an exploded schematic diagram of an antenna filter unit provided by an embodiment of the disclosure. FIG. 7 is an upper view of the antenna filter unit in FIG. 6. FIG. 8 is a bottom view of the antenna filter unit in FIG. 6.

FIGS. 6 to 8 mainly show that the radiation elements 2011 are arranged in an 8*2 manner, which can be applied to a legacy base station (LBS).

Figure 9:
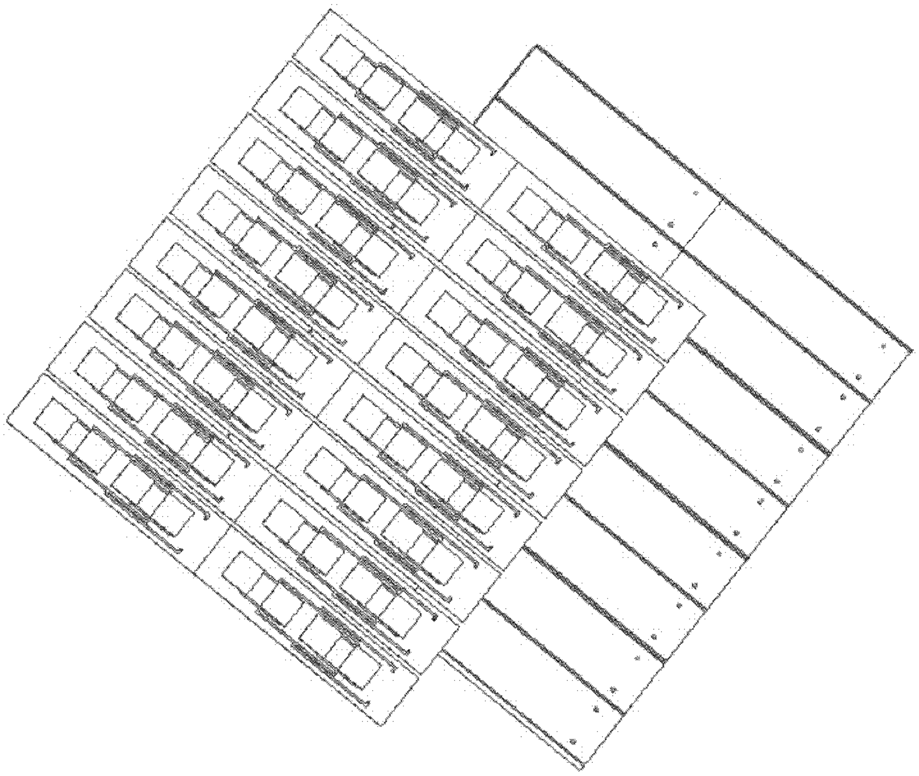
FIG. 9 is an exploded schematic diagram of an antenna filter unit provided by an embodiment of the disclosure.
Figure 10:
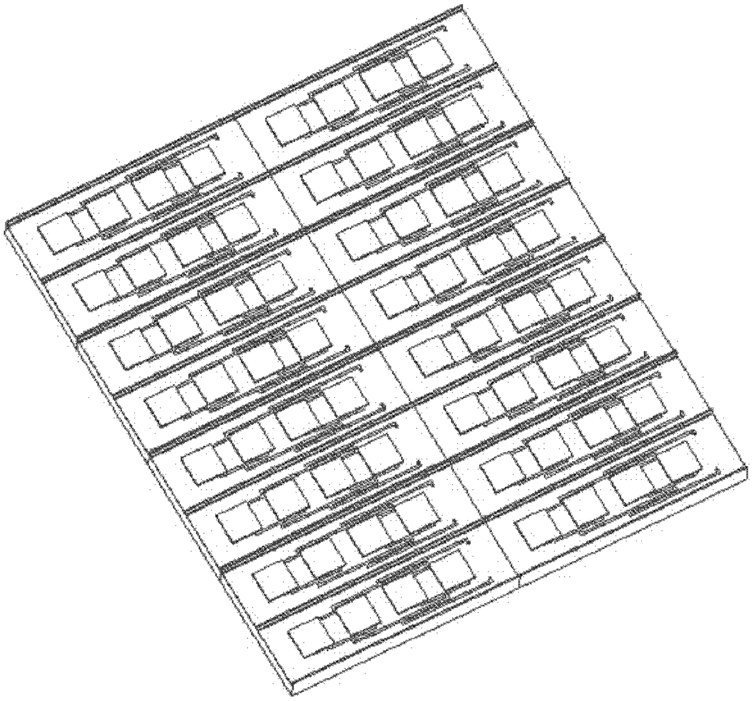
FIG. 10 is an upper view of the antenna filter unit in FIG. 9.
Figure 11:
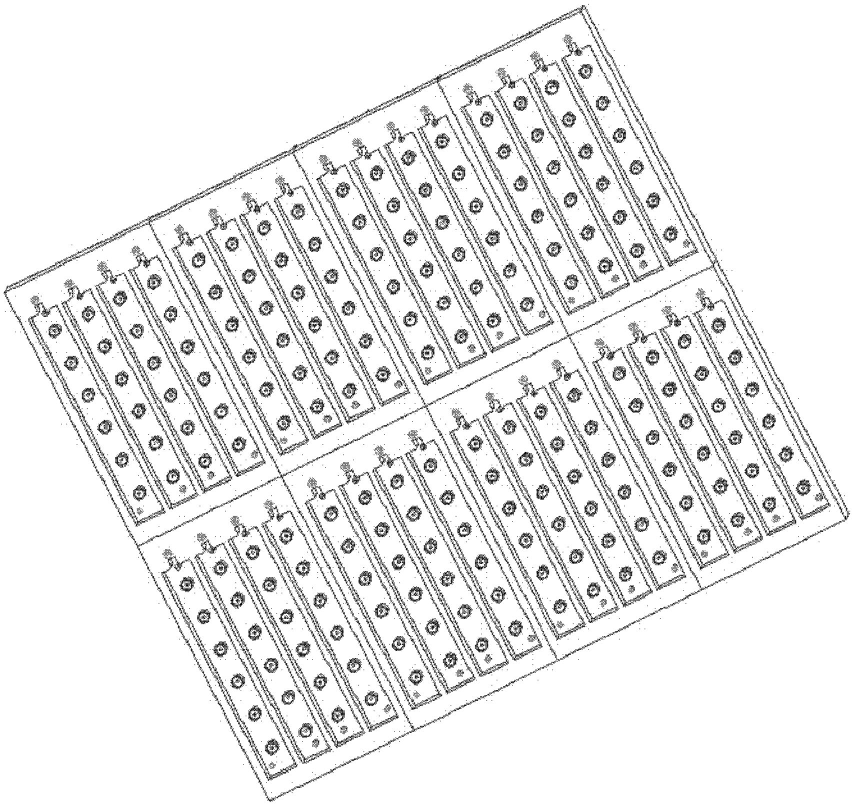
FIG. 11 is a bottom view of the antenna filter unit in FIG. 9.

FIG. 9 is an exploded schematic diagram of an antenna filter unit provided by an embodiment of the disclosure. FIG. 10 is an upper view of the antenna filter unit in FIG. 9. FIG. 11 is a bottom view of the antenna filter unit in FIG. 9.

FIGS. 9 to 11 mainly show that the radiation elements 2011 are arranged in an 8*8 manner, which can be applied to AAS (Advanced Antenna System) base stations and the like.

It should be understood that FIGS. 1-3 and 6-11 are examples, rather than limitations on the arrangement of the radiation elements 2011. The embodiments of the disclosure can be applied to various base station forms of various communication systems (for example, including but not limited to 3G, 4G, 5G, etc.).

Therefore, in the embodiment of the disclosure, an antenna filter unit (AFU) is provided. By means of the reusing of the reflection plate 202 with at least a part of the cavity filter 3, the number and volume of elements in the radio system are reduced, so as to increase the degree of integration, reduce weight and installation space, and reduce costs.

Further, the isolation bar 204 and the like can be integrally die casted with the cavity filter 3, etc. A separate reflection plate and a separate isolation bar in the legacy solution are no longer needed. That manner can further reduce the required installation space and installation procedures.

Further, the arrangement of the pin connector 4 can avoid the use of legacy radio/RF connectors, so as to further reduce the required installation space and installation procedures, and avoid signal loss, distortion, etc., caused by connector joints, cables, etc., thereby improving electrical performance.

That is, in the application of the embodiment of the disclosure, a legacy antenna unit (AU) can be integrated into a remote radio unit (RRU) first, and then the antenna unit (AU) and a cavity filter unit (FU) in the remote radio unit (RRU) can be integrated as an antenna filter unit (AFU). This solution is suitable for legacy base stations (LBS), small cells\street macro base stations, advanced antenna system (AAS) base stations, etc. It is especially suitable for situations wherein only a cavity filter can be used in a remote radio unit (RRU) due to requirements of high power, low PIM and high insertion loss.

Therefore, the embodiments of the disclosure can first further compress the installation space required by the radio system, and then can also reduce the installation procedures, and greatly reduce the use of metal screws, plastic screws, and radio/RF connectors. The radio system not only benefits in terms of size, but also benefits in terms of cost, weight, and production efficiency. Moreover, since the overall structure is simpler than legacy solutions, production efficiency, especially assembly efficiency, will be greatly improved. From the perspective of material cost, at least one reflection plate and a plurality of connectors are saved. From the perspective of performance, a smaller size can be achieved under the same performance, and if the same size is maintained, better performance can be obtained.

It can be understood that the above implementations are merely exemplary implementations adopted to explain the principle of the disclosure, but the disclosure is not limited thereto. For those of ordinary skill in the art, various variations and improvements can be made without departing from the spirit and essence of the disclosure, and these variations and improvements are also regarded as the protection scope of the disclosure.

What is claimed is:

1. An antenna filter unit, comprising:
- a radiation unit comprising a plurality of radiation elements, wherein each of the plurality of radiation elements is configured to radiate a signal; and
- a cavity filter coupled to the radiation unit, wherein
- the radiation unit is arranged on an outside of a wall of a cavity of the cavity filter,
- at least part of the wall is also arranged as a reflection plate for the radiation unit, and the reflection plate is configured to reflect the radiation signals generated by the radiation unit.

2. The antenna filter unit of claim 1, further comprising: an isolation bar, arranged on the at least part of the wall and located among the plurality of radiation elements of the radiation unit.

3. The antenna filter unit of claim 2, wherein the isolation bar comprises a protrusion structure formed by die casting.

4. The antenna filter unit of claim 2, wherein
- the plurality of radiation elements comprises a first column of radiation elements and a second column of radiation elements, and
- the isolation bar is located between the first column of radiation elements and the second column of radiation elements.

5. The antenna filter unit of claim 1, wherein the radiation unit is coupled to the cavity filter via a pin connector.

6. The antenna filter unit of claim 5, wherein the pin connector is coupled to a resonant column in the cavity of the cavity filter.

7. The antenna filter unit of claim 6, wherein the pin connector is configured to be inductively coupled to the resonant column.

8. The antenna filter unit of claim 6, wherein the pin connector is configured to be capacitively coupled to the resonant column.

9. The antenna filter unit of claim 5, wherein the pin connector comprises a metal pin arranged perpendicular to the at least part of the wall.

10. The antenna filter unit of claim 5, further comprising a feed network, wherein the radiation unit is coupled to the pin connector via the feed network.

11. The antenna filter unit of claim 1, wherein the entire wall is arranged as the reflection plate.

12. A radio unit, comprising:
- a radio circuit board; and
- an antenna filter unit, wherein
- the antenna filter unit comprises a radiation unit and a cavity filter coupled to the radiation unit,
- radiation unit comprising a plurality of radiation elements, wherein each of the plurality of radiation elements is configured to radiate a signal,
- the radiation unit is arranged on an outside of a wall of a cavity of the cavity filter,
- at least part of the wall is also arranged as a reflection plate for the radiation unit, and
- the reflection plate is configured to reflect the radiation signals generated by the radiation unit.

* * * * *